Feb. 3, 1970 C. R. VAN NIEL ET AL 3,492,910

FASTENING DEVICE

Filed May 28, 1968 2 Sheets-Sheet 1

INVENTORS
CLARENCE R. VAN NIEL
BY WILLIAM L. SEITZ

Teare, Teare & Sammon

ATTORNEYS

Feb. 3, 1970   C. R. VAN NIEL ET AL   3,492,910
FASTENING DEVICE

Filed May 28, 1968   2 Sheets-Sheet 2

INVENTORS
CLARENCE R. VAN NIEL
WILLIAM L. SEITZ
BY
Teare, Teare & Sammon
ATTORNEYS United States Patent Office 3,492,910
Patented Feb. 3, 1970

3,492,910
FASTENING DEVICE
Clarence R. Van Niel, North Olmsted, and William L. Seitz, Parma, Ohio, assignors to Tinnerman Products, Inc., Cleveland, Ohio, a corporation of Ohio
Filed May 28, 1968, Ser. No. 732,573
Int. Cl. F16b 13/04, 33/04
U.S. Cl. 85—81                                    20 Claims

ABSTRACT OF THE DISCLOSURE

A fastening assembly for mounting with an apertured support panel comprising a plug-like fastener member and an expander member adapted for lockingly deforming the fastener member in the aperture. The fastener member includes a generally U-shaped body and a tubular member mounted thereon adapted for internally receiving a connector member and for engaging the expander member so that the expander member is operable independently of the movement of the connector member.

BACKGROUND OF THE INVENTION

The present invention relates to fastening devices, and more particularly relates to a fastening assembly for maintaining two panels or more in adjustable, spaced relationship, such as in vehicle headlamp adjustment mountings.

Heretofore, it has been known to provide various fasteners of the type which receive a threaded member, such as a screw, for mounting with an apertured support panel. Such prior devices have been made of a polymeric material and have generally included a flexible or bifurcated shank for receiving a threaded member to expand the shank for securement within the panel. These prior devices use the threaded member, directly or indirectly, to effect an expanding of the shank to lock the device. Consequently, the degree of expansion and locking is dependent upon the degree to which the threaded member is turned into the device. Any accidental rotation of the threaded mamber resulting from vibration, or the like, correspondingly reduces the locking power of the fastener. Consequently, such prior devices have not been satisfactory for mounting panels in adjustably spaced relationship where vibration is present. Furthermore, any adjustment of the threaded member to adjust spacing between the panels correspondingly affects the locking power of the fastening device.

SUMMARY OF THE INVENTION

In the invention, a fastening assembly for mounting with an aperture of a support panel includes a plug-like fastener member which is adapted for insertion through the aperture and an expander member which is adapted to engage an exterior end of the fastener member to lock it within the aperture. In one form, the fastening assembly includes a tubular member having a bore in the fastener member for receiving a connector member while the expander member is operable to deform the fastener member independently of movement of the connector member. In another form, the fastener member extends from a base on one side of the support panel.

By the foregoing arrangement, there is provided a novel fastening assembly which is of a simple construction, for readily and efficiently connecting panels in adjustably spaced relationship and for providing such connection with vibration dampening characteristics.

DESCRIPTION OF THE PREFERRED EMBODIMENTS

Figure 7:
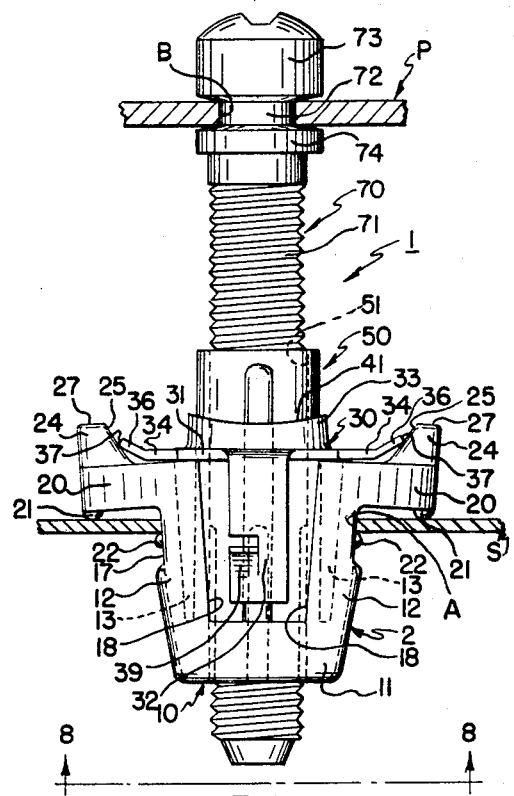
FIG. 7 is a fragmentary, front elevational view, partly in section, of the fastening assembly of FIG. 5 and showing the fastening assembly mounted in a support panel and retaining a second panel.
Figure 8:
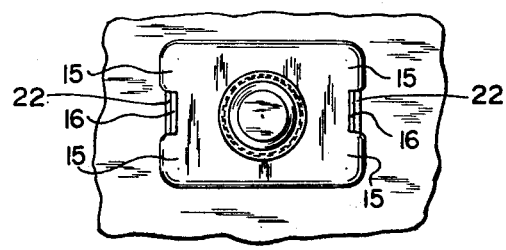
FIG. 8 is a fragmentary, bottom plan view of the fastening assembly of FIG. 7.

In general, and with reference to FIG. 7, there is shown a fastening assembly, generally designated at 1, in accordance with the present invention. A plug-like fastener member 2 is provided for lockable engagement with a support panel S. The support panel S, such as a vehicle panel, is provided with an aperture A for the receipt of the fastener 2. The plug-like fastener member 2 includes a deformable U-shaped body 10 and a tubular member 50. A resilient expander member 30 may be detachably connected to the tubular member 50 which acts to outwardly expand the deformable body 10 into locking engagement with the panel S. A connector member 70, carrying a second panel P, coacts with the tubular member 50 for adjustable positioning of the panel P with respect to the panel S, such as for aligning vehicle headlamps.

The U-shaped body 10, which is preferably formed of a resilient material, such as plastic or the like, is provided with a base-like web 11, a pair of arms 12 extending upwardly from the web 11, and pairs of parallel cam ribs 15 which all cooperate to facilitate the insertion of the body 10 into the aperture A in the panel S.

Figure 1:
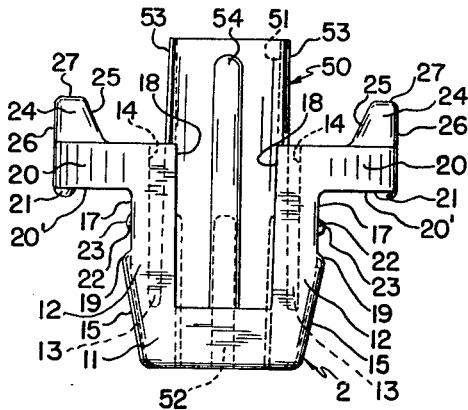
FIG. 1 is a front elevation view of the fastener member of the invention.
Figure 2:
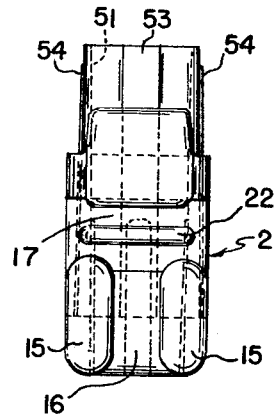
FIG. 2 is a side elevation view of the fastener member of FIG. 1.

The web 11 is disposed at the lower end of the U-shaped body 10 and has lesser widthwise and lengthwise dimensions than those of the aperture A. The arms 12 are integrally attached to the web 11 for resilient inward and outward flexure relative to the longitudinal central axis of the fastener member 2. Such flexure permits the arms to pivot inwardly at their juncture with the web 11, facilitating insertion into the aperture A. Their inner surfaces 14, which terminate in generally mutually parallel outer edges 18 (FIG. 1), define concave cylindrical segments which are generally parallel to and spaced from the confronting external periphery of the tubular member 50. The relief space 13 defined between the surfaces 14 and the tubular member 50 provides the space for the inward flexure of the arms 12.

Figure 4:
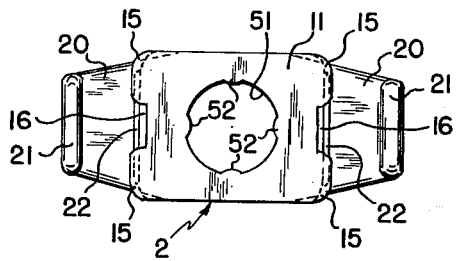
FIG. 4 is a bottom plan view of the fastener member of FIG. 1.

A pair of spaced, arcuate-in-cross section cam ribs 15 (FIG. 1) commence at the bottom of the web 11 on opposite sides thereof and taper upwardly and outwardly, terminating at a point approximately one-half of the length of the arms 12. The ribs are separated by planar recesses 16 (FIG. 4) which are tapered parallel to the taper of the ribs 15 and which extend for slightly less than the distance of the ribs 15. The span between the lower extremities of the ribs 15 is less than the corresponding dimensions of the aperture A; and the span between the upper shoulders 19 of the ribs 15 is slightly greater than the corresponding dimensions of the aperture A, so that the progressive engagement of the ribs 15 with the aperture A progressively inwardly pivots the arms 12 upon insertion therein. By this arrangement, the degree of flexing may be determined by the relationship between the lateral spacing of the shoulders 19 of the cam ribs 15 and the corresponding dimension of the aperture A.

Figure 3:
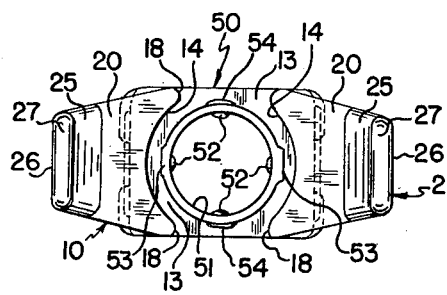
FIG. 3 is a top plan view of the fastener member of FIG. 1.

The arms 12 are provided with integral flanges 20, spacing ribs 21 and stop ribs 22 which coact to prevent axial shifting of the body 10 after insertion of the body 10 in the panel S. The base-like flanges 20 extend generally perpendicularly outwardly from the upper extremities of the arms 12 so as to rest above the panel S in the installed position of the body 10 and to provide an upper base for the body 10. In top plan (FIG. 3), the sides of the flanges 20 taper convergently as they extend outwardly to contribute to the strength and flexural resilience of the flanges 20. The spacing ribs 21 are of arcuate shape in cross section and extend transversely on the planar lower surface 20′ of the flanges 20. The ribs 21 are disposed adjacent the outer extremities of the flanges, and engage the upper surface of the support panel S after insertion to space the flanges 20 from the panel S so as to provide a fulcrum point for flexure of the flanges 20 during operation. Such flexure contributes to the vibration damping qualities of the fastening assembly 1 and also facilitates assembly of the body 10 on panels of varying thickness.

The flanges 20 and associated ribs 21 resiliently lock the body 10 against downward axial movement. Stop ribs 22, disposed on the arms 12 a spaced distance from the flanges 20, lock the body 10 against upward axial movement. The stop ribs 22 are arcuate in cross section and integrally project from and extend transversely across planar intermediate outer surfaces 17 of the arms 12. The outer surfaces 17 are generally parallel to the outer edges 18 of the inner surfaces 14 and are spaced from each other, in the relaxed condition, by a distance slightly less than the corresponding dimensions of the aperture A of the panel S. The stop ribs 22 are mounted on the intermediate surface 17 so that the uppermost portions of the stop ribs are spaced from the flanges 20 by a distance $r$ (FIG. 5), which is approximately the thickness of the panel S plus the height of the depending spacing ribs 21. In assembly of the fastener member 2, should the distance $r$ be undersize, the dimension is accommodated by the upward flexure of the flanges 20; whereas should the distance $r$ be oversize, the dimension is accommodated by the downward flexure of the flanges 20 caused by the downward exerted force of the expander member 30. As a result, the fastener may be applied to panels of slightly varying thicknesses. The lateral extension of the stop ribs 22 is less than the lateral projection of the shoulders 19 of the cam ribs 15 so that when the body 10 is inserted in the aperture A, thereby flexing the arms 12 inwardly, the stop ribs will readily pass beyond the confronting marginal edges of the aperture, thereby disposing the stop ribs 22 and spacing ribs 21 on opposite sides of the panel S. The span between the outermost extremities 23 of the stop ribs 22, when the arms are in the relaxed condition, is greater than the corresponding dimensions of the aperture A so that the stop ribs 22 temporarily prevent upward axial movement when the arms have returned to their relaxed position and permanently prevent such movement in the installed position of the expander member 30.

A pair of oppositely disposed upstanding wings 24 are integrally mounted transversely adjacent the outer ends of the flanges 20 to provide both abutment and lever actions with the expander member 30 so that the arms 12 and the flanges 20 flex to lock the fastening assembly 1 in place on the panel S. Due to the remote disposition of the wings 24 from the web 11, less force need be applied to the wings 24 to flex the arms 12 outwardly, to permanently lock the body 10 against axial shifting and, therefore, to install the fastener member 2. An inclined cam surface 25 is provided on the inner side of each wing 24 and extends downwardly and inwardly with respect to the longitudinal central axis of the fastener. By this construction, the cam surfaces 25 progressively engage the expander member 30 as the latter is moved axially downwardly between the wings 24 so that the wings 24 are urged progressively apart, thereby flexing the arms 12 outwardly and locking the fastener member 2 in position. Initiation of this progressive engagement is facilitated by the rounded top 27 on each wing 24. Such progressive engagement of the expander member 30 with the cam surfaces 25 also tends to flex the flanges 20 due to the lever action of the wings 24 against the fulcrum points of the spacing ribs 21. Such flexing of the flanges 20 resiliently biases the spacing ribs 21 and stop ribs 22 into locking abutment with the upper and lower surfaces of the panel S. The thickness between the inclined cam surface 25 and the generally vertical outer surface 26 progressively increases in an axially downward direction so that the reinforcement increases with the progressive engagement of the expander member 30 with the cam surfaces 25.

Figure 5:
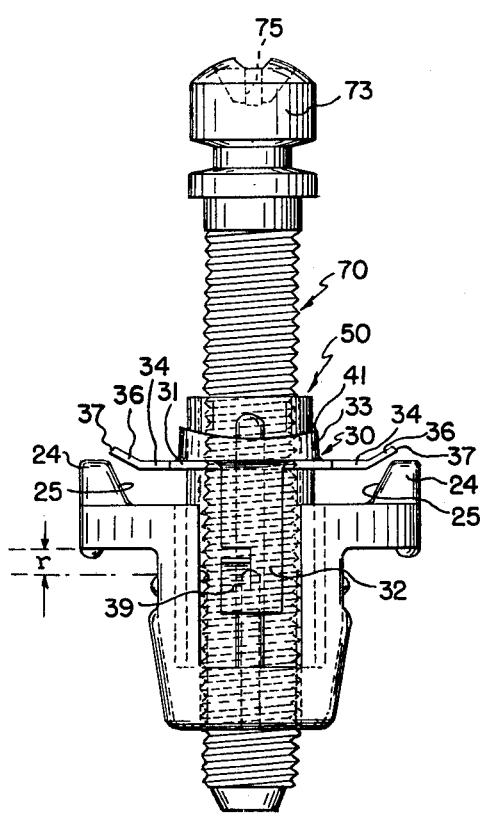
FIG. 5 is a front elevation view of the fastening assembly of the invention including the fastener member of FIG. 1.

In general, the expander member 30 is of a resilient T-shaped construction, which is made of metal, such as steel or the like, and is provided with a base 31, a pair of depending legs 32 and an upstanding endless flange 33 (FIGS. 5 and 7). The flange 33 serves to position and locate the expander member 30 in relation to the tubular member 50 and the U-shaped body 10, while the legs which extend downwardly from opposed sides of the base 31 act to stabilize the expander member 30. The flat base 31 extends generally perpendicularly to the longitudinal central axis of the fastener member 2 and acts to transfer the axial downward movement of the expander member 30 into lateral, outward flexing of the arms 12 to effect locking of the fastener member 2.

The base 31 of the expander member 30 is provided at its opposed ends 34 with upwardly and outwardly inclined flanges 36, each of which has a terminal edge 37 so that as the expander member 30 moves axially downwardly of the fastener member 2, the terminal edges 37 engage the wings 24, urging the arms 12 outwardly into locking engagement with the panel S. The base 31 has a lengthwise dimension, between the terminal edges 37, which is at least greater than the minimum transverse dimension between the lower portions of wings 24 (FIG. 5) and is preferably also slightly greater than the maximum transverse distance between the opposed upper portions of the wings 24. As the base 31 moves axially downwardly, its terminal edges 37 deflect the wings 24 arcuately outwardly and downwardly, thereby flexing the arms 12 outwardly into locking engagement with the edges of the aperture A. Because the lengthwise dimension of the base slightly exceeds the corresponding span between the wings 24, deflection is maximized. Since the base 31 extends symmetrically an equal distance to each side of the aforesaid axis, a symmetrical, equal force is exerted against the wings 24, thereby stabilizing the downward movement of the expander member 30.

The flanges 36 of the base 31 are inclined at an angle from the horizontal which is less that the corresponding angle of inclination of the cam surfaces 25 (FIG. 5) of the wings 24. Consequently, the inclined flanges 36 and their terminal edges 37 contact the wings 24 at an acute angle to achieve the desired smooth camming action. Because of the acute angular contact, this smooth engagement occurs whether the lengthwise dimension of the base 31 is greater or lesser than the maximum span between the wings 24. In the latter case, initial engagement is between the terminal edges 37 and the cam surfaces 25. Thus, even though deformation may occur during packaging or repeated use, a smooth engagement and proper fit of the expanded member 30 is obtained. The terminal edges 37 also grip the cam surface 25 to limit upward axial movement of the expander member and to prevent accidental disengagement. These edges 37 are curved in side elevation so that there is a line contact between the edges 37 and the cam surfaces 25. Thus, the terminal edges 37 of the inclined flanges 36 grip the cam surfaces without corners of the edges 37 contacting the cam surfaces 25 and scoring or biting them.

Legs 32 bend downwardly in an axial direction from opposed sides 38 of the base 31. Each leg 32 has a tongue 39 struck upwardly and outwardly from the material of the leg. Such legs 32 and their associated tongues 39 limit the upward and downward axial movement of the expander member 30 and stabilize the expander member 30 during insertion. These legs 32 are disposed on the sides 38 of the base 31 intermediate the aforesaid inclined flanges 36. In the assembled position, the legs 32 extend between the outer edges 18 of the arms 12. The aforesaid disposition of the legs 32 between the outer edges 18 stabilizes the expander member against lateral rocking and facilitates positioning of the expander member 30 around the tubular member 50. The expander member 30 is further stabilized against transverse rocking by the slight downward convergence of the legs 32 toward each other which brings the legs 32 into progressively greater proximity to the tubular member 50. The tongues 39 are disposed adjacent the ends of the legs 32 on opposite sides of an axial plane passing through the mid-portion of each leg 32. These tongues 39 terminate at their uppermost extremities a sufficient axial distance from the base 31 so that they are disposed beneath the lower surface of the support panel S when the fastening assembly 1 is installed. Thus, the tongues resiliently limit upward axial movement of the expander member when it is installed, preventing accidental disengagement of the expander member 30 and dislodgment of the fastening assembly 1.

Figure 6:
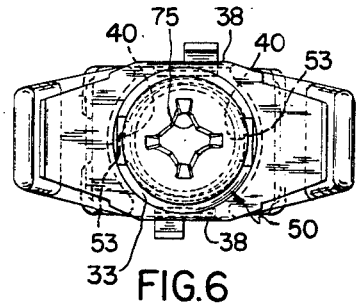
FIG. 6 is a top plan view of the fastening assembly of FIG. 5.

The endless flange 33 is struck-out centrally of the base 31 to define a passageway through which the tubular member 50 slides in the positioning of the expander member 30 on the fastener member 2. The endless flange 33 is oblate in cross section (FIG. 6) and is upwardly and outwardly tapered so as to progressively engage the tubular member 50. The inside minor and major diameters of the flange 33 adjacent its lower edge are greater than the confronting outer diameter of the tubular member 50 to facilitate entry of the tubular member 50 into the central passageway of the endless flange 33. The inside minor diameter of the flange 33 commencing at a point part way along its axial length is progressively less than the outside diameter of the tubular member 50 so that the flange 33 progressively unidirectionally deforms the tubular member 50 in the direction of the flange's major diameter as the flange 33 slides along the tubular member 50. This unidirectional deformation aligns the base 31 with the wings 24 and prevents twisting dislocation of the expander member 30. Owing to the taper of the endless flange 33, the upper marginal edge of the flange 33 contacts the tubular member 50 at an angle to allow downward sliding of the expander member 30, but prevents its upward axial movement and contributes to the locking of the expander member 30 on the fastener member 2.

The endless flange 33, preferably, has a pair of axial, struck-out grooves 40 which align the base 31 with the wings 24. The axial grooves 40 are generally rectangular in top plan (FIG. 6) so as to coact with correspondingly configured rib elements of the tubular member 50 to provide the desired alignment and to prevent twisting of the expander member 30 on the tubular member 50. The grooves 40 are disposed in an axial plane which is generally perpendicular to the axial plane which passes through the legs 32. The grooves 40 are co-extensive in length with the height of the endless flange 33 to minimize transverse lateral rocking of the expander member 30.

The tubular member 50 (FIG. 1) integrally projects from the web 11 between the arms 12 and has an internal axial bore 51 to receive the connector member 70, a plurality of inclined internal ribs 52 (FIG. 3) disposed on the surface of the bore 51 to self-threadingly hold the adjustable connector member 70, and a plurality of inclined external ribs 53, 54 to position the expander member 30 on the fastener member 2. The bore 51 extends in an axial direction for the entire length of the tubular member 50 and through the web 11. The inside diameter of the generally circular bore 51 tapers inwardly and downwardly so as to progressively coact with the threaded connector member 70. In turn, the outside diameter of the tubular member 50 tapers outwardly and downwardly so as to progressively engage the expander member 30, resulting in the progressive deformation of the tubular member 50. This tubular member 50 is of a thin-wall construction made of a resilient polymeric material, such as nylon or the like. This thin-walled, deformable construction is achieved by having the wall thickness of the tubular member 50 generally less than the corresponding thickness through the ribs 52, 53, 54.

Preferably, the inclined external ribs 53 act as a pair of guides for coaction with the grooves 40 of the expander member 30, while a pair of reinforcing ribs 54 disposed between the outer edges 18 of the arms 12 act as reinforcement for the tubular member 50. The guide ribs 53 extend in an axial direction and are inclined outwardly and downwardly in parallel relation to the outside diameter of the tubular member 50. Such guide ribs 53 are rectangular in transverse cross section so as to receive the correspondingly shaped grooves 40 of the expander member 30. Further, such guide ribs 53 extend in the same axial plane as grooves 40 so that the expander member 30 moves in an axial direction upon insertion thereof. The guide ribs 53 are co-extensive in length with the axial height of the tubular member 50, which is greater than the axial extent of the arms 12 with their associated flanges 20 and wings 24, so as to position the expander member 30 prior to the engagement of such expander member 30 with the wings 24. The reinforcing ribs 54 extend in an axial direction and are inclined outwardly and downwardly in parallel relation to the outside diameter of the tubular member 50. However, such reinforcing ribs 54 terminate short of the upper extremity of the tubular member 50 so that the guide ribs 53 engage the grooves 40 prior to the engagement between the reinforcing ribs 54 and the endless flange 33. The reinforcing ribs 54 are disposed in an axial plane which extends generally medially between the outer edges 18 so that the engagement of the reinforcing ribs 54 with the endless flange 33 occurs at the minor diameter of the endless flange 33. Such reinforcing ribs 54 are arcuate in transverse cross section to provide smooth bearing engagement between themselves and the endless flange 33 during deformation of the tubular member 50. Due to their thickness, the ribs 54 reinforce the thin-walled construction of the tubular member 50 and space the outer surface of the tubular member 50 from the inner surface of the endless flange 33.

Preferably, the aforesaid internal ribs 52 are disposed symmetrically within the axial bore 51 adjacent the external ribs 53, 54. The ribs 52 extend in a generally axial direction and are inclined downwardly and inwardly in parallel relation to the inside diameter of the axial bore 51 so as to progressively, self-threadingly engage the connector member 70. This self-threading engagement commences below the horizontal plane of the panel S, as the internal ribs 52 extend from the bottom surface of the web 11 upwardly to the aforesaid horizontal plane of the support panel S. This engagement between the connector member 70 and the internal ribs 52 is eased by the arcuate transverse cross section of the internal ribs 52.

The connector member 70 connects the panel P in adjustable spaced relation to the support panel S. Such connector member 70 is provided with a threaded body 71 which is of lesser outside diameter than the inside diameter of the tubular member 50 so as to self-threadingly engage the tubular member 50. Such self-threading engagement anchors the connector member 70 to the fastener member 2 and the associated support panel S. The threaded body 71 is of greater axial length than the axial bore 51 so as to permit axial adjustment of the connector member 70. The head end of the connector member 70 remote from the threaded body 71 is confined to support and limit axial movement of the panel P. This end has a reduced diameter neck 72 which may be disposed within a suitably configured aperture B provided in panel P. Also, this end has a head 73 and an annular flange 74 disposed above and below the neck 72, respectively, which have increased diameters to limit the upward and downward axial movement of the panel P. The diameter of the annular flange 74 is greater than the diameter of the threaded body 71 so as to limit the downward axial movement of the connector member 70. In addition, the head 73 (FIG. 5) may be provided wtih a suitable tool engagement recess 75. Hence, the spacing betwen the panel P and the support panel S may be adjusted by applying a suitable tool to the connector member 70 from above the panel P.

The fastener assembly 1 of the invention may be quickly installed at the work site since it can be pre-assembled prior to shipment. Preferably, the fastening assembly 1 is pre-assembled with the T-shaped expander member 30 partially positioned on the tubular member 50 and with the connector member 70 partially threaded into the tubular member 50. Such preassembly may be easily effected by inserting the endless flange 33 of the expander member 30 over the tubular member 50 with the corresponding grooves 40 and guide ribs 53 aligned and the terminal flanges 36 of the expander member 30 spaced from the confronting surfaces of the wings 24 and until the expander member 30 is wedged on the tubular member 50. The connector member 70 may then be threaded into the tubular member 50 until the end of the connector member 70 remote from the head 73 is disposed axially downwardly of the bottom surface of the web 11. If desired, of course, such rapid preassembly may also be performed at the work site when the component parts are shipped separately.

The pre-assembled fastener assembly 1 may be installed at the job site by inserting the assembly 1, web 11 first, into an aperture A having at least two marginal edges and pushing the assembly 1 axially downwardly in one rapid, continuous stroke so that the cam ribs 15 engage the marginal edges and resiliently flex the arms 12 inwardly. During this movement the marginal edges of the aperture pass over the shoulders 19 of the cam ribs 15 and over the stop ribs 22 until spacing ribs 21 abut with the support panel S, thereby flexing the flanges 20 of the arms 12. The transverse stop ribs 22 prevent reverse upward axial movement of the fastening assembly 1 when this axially downward stroke ends. The T-shaped expander member 30 may then be pushed axially downwardly so that the ends 34 of the base 31 engage the cam surfaces 25 of the wings 24. This engagement deflects the wings 24 so that the arms 12 flex outwardly into abutment with the support panel S and so that the flanges 20 of the arms 12 resiliently flex. The expander member 30 locks itself against reverse, upward axial movement by the gripping action of the terminal edges 37 with the cam surfaces 25 of the wings 24 and the gripping engagement of the upper edge 41 of the endless flange 33 with the tubular member 50. In this locked condition, the arms 12 and their associated flanges 20 are resiliently biased so as to resiliently lock the fastener assembly 1 to the support panel S. Finally, the panel P is attached to the neck 72 of the connector member 70 and the connector member 70 adjusted to the predetermined spacing. The fastening assembly 1 may be disengaged from the support panel S merely by first depressing the tongues 39 on the legs 32 of the expander member 30 and then applying an inward force to the wings 24 and the flanges 20 using a suitable tool.

By the foregoing arrangement, there is provided a novel fastening assembly of simple construction for connecting and maintaining panels in adjustably spaced relation. Such construction provides locking power to the fastening assembly 1 which is independent of the action of the connector member 70 since the expander member 30 moves independently. A further benefit of this construction is its vibration damping characteristics. First, the relief space 13 structurally isolates the connector-receiving tubular member 50 from vibration transmitted to the arms 12 by the support panel S. Further the relative disposition of the tubular member 50, web 11, expander member 30 and arms 12 with their associated flanges 20 and wings 24 contributes to vibration damping. The arms 12 engage the web 11 and expander member 30 for resilient pivoting without engaging the tubular member 50. Accordingly, vibration originating in the support panel S will be dampened by the spaced, resilient flexure of the arms 12 which abut with the panel S. The fastening assembly's construction also provides positive lateral and axial locking action since the arms 12 are resiliently biased laterally against the marginal edges of the aperture A while the stop ribs 22 and the spacing ribs 21 are resiliently biased axially against the opposed surfaces of the support panel S.

We claim:

1. A fastening device for mounting with an apertured support member comprising, a resilient base adapted to be disposed adjacent one side of said support member, a deformable, plug-like member extending from said base adapted for insertion through the aperture in said support member, said plug-like member including spaced, oppositely disposed resilient arms extending from said base and connected together adjacent the ends remote from said base, an expander member attachably operable with said base for deformably locking said plug-like member within the aperture in said support member, and a tubular member disposed in spaced relation between said arms adapted for threadably receiving a connector element therein, said expander member including a body having an opening adapted to receive said tubular member therethrough, and said opening defined by an endless outwardly extending flange adapted for sliding coacting engagement with respect to the confronting outer surface of said tubular member 2. A fastening device in accordance with claim 1, wherein said base includes spaced, oppositely disposed cam means adapted for engagement by said expander member to cause flexure of said base and outward deformation of said plug-like member.

3. A fastening device in accordance with claim 1, wherein said plug-like member includes spaced, oppositely disposed cam means adapted for engagement with the confronting marginal edges of the aperture in said support member to cause inward deformation of said plug-like member.

4. A fastening device in accordance with claim 1, wherein said base includes spaced, oppositely disposed abutment means adapted for engagement with said one side of said support member adapted to limit movement of said plug-like member in an inward direction with respect to said support member.

5. A fastening device in accordance with claim 1, wherein said plug-like member includes spaced, oppositely disposed rib means adapted for engagement adjacent the marginal edges presented by the aperture in said support member to limit movement of said plug-like member in an outward direction with respect to said support member.

6. A fastening device in accordance with claim 1, wherein said base includes spaced, oppositely disposed flange portions extending outwardly adjacent the free ends of said arms, and outwardly extending cam means disposed adjacent the ends of said flange portions adapted for engagement by said expander member to cause flexure of said base and outward information of said arms.

7. A fastening device in accordance with claim 2, wherein said tubular member is of an elongated, generally cylindrical construction having an axial bore adapted for self-threading coacting engagement with said connector element.

8. A fastening device in accordance with claim 1, wherein the opening inthe body of said expander member is non-circular in shape adapted for resilient deformation of said tubular member in the direction of the maximum transverse dimension of said opening.

9. A fastening device in accordance with claim 1, including guide means disposed on the interior of said flange and other guide means disposed on the exterior of said tubular member to axially guide said expander member with respect to said tubular member.

10. A fastening device in accordance with claim 9, wherein
the guide means on said tubular member include spaced, oppositely disposed axially extending guide ribs, and
the radial thickness of said ribs being greater than the transverse wall thickness of said tubular member to cause outward deformation of the wall of said tubular member in a direction toward said ribs.

11. A fastening device in accordance with claim 1, wherein
said expander member includes a resilient body adapted for camming coacting engagement with the base of said plug-like member,
said body having an opening adapted to slidably receive said tubular member therethrough, and
spaced, oppositely disposed resilient legs extending from said body and adapted for coacting engagement with said tubular member.

12. A fastening device in accordance with claim 11, wherein said legs each include resilient tongue means extending outwardly therefrom adapted for engagement with the other side of said support member.

13. A fastening device in accordance with claim 1, wherein
said tubular member is of an elongated, generally cylindrical construction integrally connected adjacent one end to the interconnected ends of said arms,
said tubular member having an axial length greater than the maximum lengthwise dimension of said plug-like member so as to project beyond said base, and
said tubular member being tapered in a direction toward the interconnected ends of said arms.

14. A fastening device in accordance with claim 1, wherein said tubular member is connected at one end adjacent the end of said plug-like member remote from said base and is adapted to be disposed in a direction toward its other end through an opening in said expander member, said expander member adapted for engageable coaction with said tubular member and said base for mounting a connector member disposed in said tubular member in vibration dampening relation on said support member in the deformed condition of said plug-like member.

15. A fastening device adapted for mounting with an apertured support member comprising,
a resilient base adapted for disposition adjacent one side of said support member,
a deformable, plug-like member extending from said base and adapted for insertion through the aperture in said support member, said plug-like member including spaced, oppositely disposed resilient arms extending from said base member and connected together adjacent their ends remote from said base member,
a tubular member disposed in spaced relation between said arms and adapted to receive a connector member therein,
an expander member having an opening therein for attachably receiving in guiding relation said tubular member therethrough and adapted for engageable coaction with said base member for deformably locking said plug-like member within the aperture in said support member, and
said base member including spaced, oppositely disposed cam means thereon adapted for engageable coaction with said expander member upon axial movement of said expander member toward said base member to impart resilient flexure to said base member and resilient outward deformation of the arms of said plug-like member for securement thereof with the confronting marginal surfaces of the aperture in said support member.

16. A fastening device in accordance with claim 15 wherein said arms depend from said base member and are connected together at the opposed ends thereof by a web member, said web member mounting said tubular member in spaced relation to said arms generally within the cross-sectional confines of said plug-like member.

17. A fastening device in accordance with claim 15 wherein said opening is defined by an endless flange which extends convergently in a direction away from said base member, so as to progressively engage said tubular member upon axial movement of said expander member toward said base member.

18. A fastening device in accordance with claim 15 wherein the minimum transverse dimension of said opening is less than the maximum transverse dimension of said opening and is less than the maximum transverse outside dimension of said tubular member to provide resilient deformation of said tubular member in a direction corresponding to the maximum transverse dimension of said opening upon axial movement of said expander toward said base member.

19. A fastening device in accordance with claim 15 wherein
said base member includes spaced, oppositely disposed flange portions extending outwardly from the free ends of said arms,
said flange portions including abutment means disposed on the surface of said flange portions adjacent said support member and adapted for holding said base member in spaced relation to said support member.

20. A fastening device in accordance with claim 15 wherein said device includes
a connector member disposed for threadable connection within said tubular member, and
said connector member being adapted for axial alignment within said tubular member for mounting an article on said support member.

References Cited

UNITED STATES PATENTS 2,655,072  10/1953  Poupitch _____ 85—5
2,836,215  5/1958   Rapata _____ 85—80

FOREIGN PATENTS 1,381,705  11/1964  France.

EDWARD C. ALLEN, Primary Examiner

U.S. Cl. X.R.

85—84